United States Patent [19]

Newman et al.

[11] Patent Number: 4,787,090

[45] Date of Patent: Nov. 22, 1988

[54] COMPACT DISTRIBUTED INDUCTANCE RF-EXCITED WAVEGUIDE GAS LASER ARRANGEMENT

[75] Inventors: Leon A. Newman, South Windsor; John T. Kennedy, Meriden; Richard A. Hart, Wethersfield, all of Conn.

[73] Assignee: United Technologies Corporation, Hartford, Conn.

[21] Appl. No.: 173,790

[22] Filed: Mar. 28, 1988

[51] Int. Cl.$^4$ ............................................. H01S 3/097
[52] U.S. Cl. ...................................... 372/82; 372/64; 372/35
[58] Field of Search ...................... 372/82, 64, 55, 35, 372/83

[56] References Cited

U.S. PATENT DOCUMENTS

| | | | |
|---|---|---|---|
| 4,438,514 | 3/1984 | Chenausky et al. | 372/97 |
| 4,688,228 | 8/1987 | Newman et al. | 372/64 |
| 4,703,489 | 10/1987 | Ross | 372/82 |
| 4,719,640 | 1/1988 | Chenausky et al. | 372/82 |

Primary Examiner—Leon Scott, Jr.
Attorney, Agent, or Firm—Peter R. Ruzek

[57] ABSTRACT

A compact distributed inductance RF-excited waveguide gas laser arrangement includes a housing which bounds an internal space, and a waveguide laser stack located in the internal space. The stack includes, in succession, a first electrode which may be constituted by a portion of the housing, a waveguide body bounding at least one laser cavity, a second electrode, a spacer body, and a plurality of flat inductor coils that extend along a major surface of the spacer body that faces away from the second electrode and are distributed along the length of the laser cavity. Each of the inductor coils has a first end electrically connected with the first electrode and a second end electrically connected with the second electrode so that, when alternating electric current at radio frequency is applied to one of the electrodes, the inductance of each of the inductor coils is arranged electrically in parallel with the capacitance formed between the first and second electrodes and transversely of the laser cavity.

16 Claims, 1 Drawing Sheet

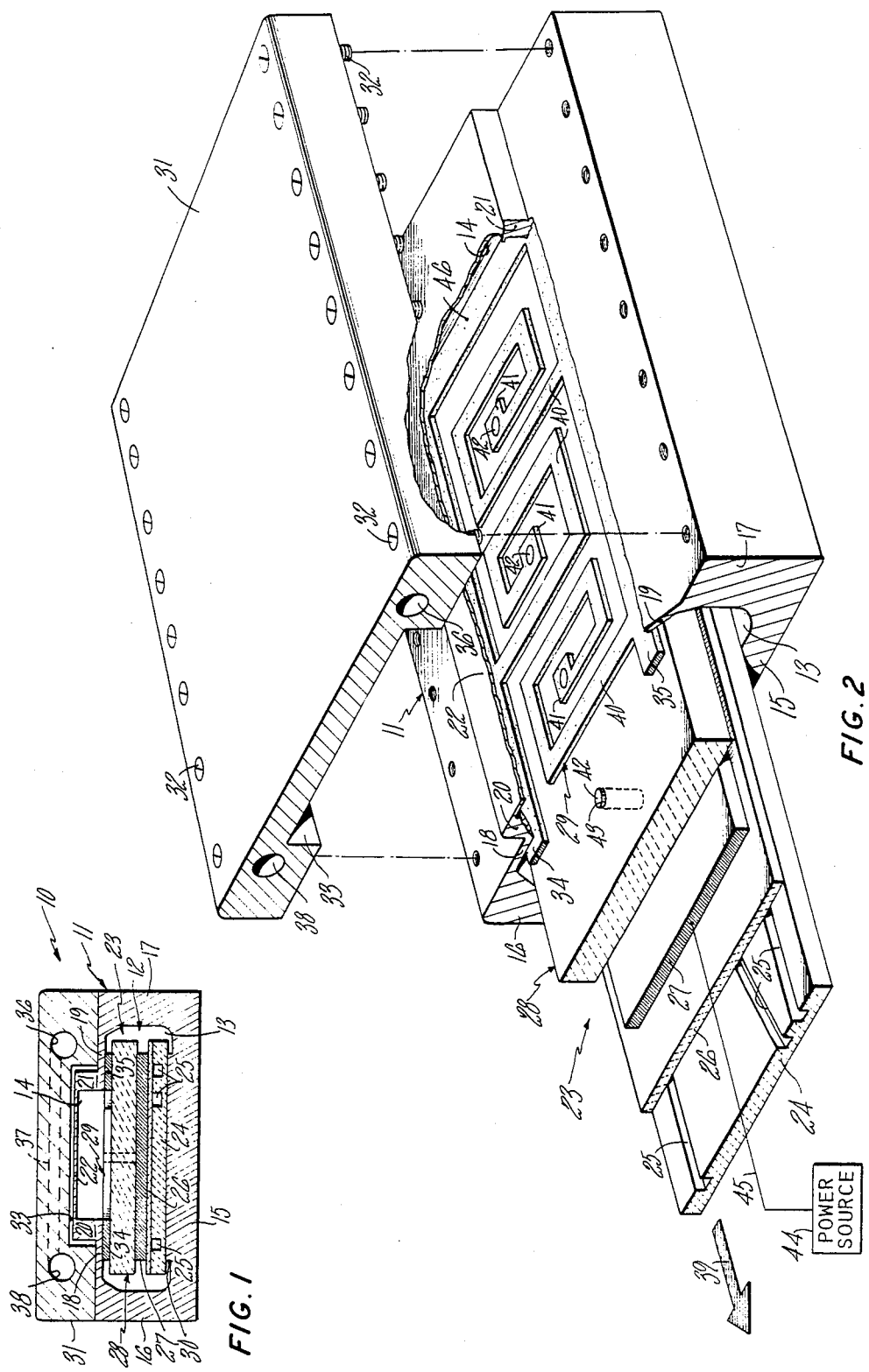

COMPACT DISTRIBUTED INDUCTANCE RF-EXCITED WAVEGUIDE GAS LASER ARRANGEMENT

DESCRIPTION

1. Technical Field

The present invention relates to waveguide gas lasers in general, and more particularly to a distributed inductance RF-excited waveguide gas laser arrangement having a very compact construction.

2. Background Art

There are already known various constructions of waveguide gas lasers, among them such in which the lasing gas which is contained in a waveguiding laser cavity is excited by an electromagnetic field that is applied transversely of the laser cavity between a "hot" electrode and a ground electrode and that oscillates at a frequency in the radio frequency (RF) range.

One example of a laser of this type is disclosed in the U.S. Pat. No. 4,169,251, issued on Sept. 25, 1979 to K. D. Laakmann and entitled "Waveguide Gas Laser with High Frequency Transverse Discharge Excitation". This arrangement, however, has a serious drawback when the length of the laser cavity is to be, as it often must be in order to obtain sufficient gain, greater than about one-fourth of the wavelength of the alternating electric excitation field, in that the electric excitation current must be fed to several longitudinally spaced regions of the "hot" electrode through multiple feeds incorporating phase-matching networks, and reactive terminations must be provided at the ends of the device. This makes this particular laser arrangement rather complicated, cumbersome, difficult to control for maximum gain, and hence expensive to construct and operate.

Another approach to the construction of RF-excited waveguide laser arrangements is disclosed in the commonly owned U.S. Pat. No. 4,363,126 issued on Dec. 7, 1982 to P. P. Chenausky et al and entitled "Tuned Circuit RF-Excited Laser". The excitation circuitry of this laser arrangement is provided with a lumped inductor that is arranged in parallel with the discharge resistance and capacitance to form a tuned circuit with such a resonance frequency that the real part of the complex impedance of the discharge cavity is matched to the output impedance of a driving oscillator. Yet, while this approach results in a significant improvement in performance over that of the above-discussed laser, it is still limited to laser cavity lengths not in excess of one-fourth of the excitation wavelength.

To overcome this limitation, it has been proposed in the commonly owned U.S. Pat. No. 4,443,877 issued on Apr. 17, 1984 to Chenausky et al and entitled "Uniformly Excited RF Waveguide Laser" to employ a plurality of discrete inductors and to situate each such inductor at an appropriate different fixed point along the laser cavity between the two electrodes. This approach eliminates nonuniformity of excitation of the discharge along the cavity which is inherently present in the above-discussed prior art approaches when the cavity length exceeds one-fourth of the wavelength of the electric excitation field unless the expensive phase-shifting networks proposed in the first-mentioned patent are used.

In a practical implementation of this approach, it has been proposed to utilize a plurality of discrete coil subassemblies, one for each of the aforementioned fixed points. Each such subassembly consists of a multitude of parts and passes though a hole provided in a spacer separating the "hot" electrode from a laser housing that is separate from, but is maintained at the same electric potential as, the ground electrode. As advantageous as the laser assembly or arrangement of this construction is in many respects, the very high number of parts which must be separately manufactured and assembled with one another during the manufacture of the laser arrangement of this construction renders the manufacture and assembly of this laser arrangement rather time-consuming and hence expensive.

Accordingly, it is a general object of the present invention to avoid the disadvantages of the prior art.

More particularly, it is an object of the present invention to provide a laser arrangement which does not possess the disadvantages of the known arrangements of this kind.

Still another object of the present invention is so to develop the laser arrangement of the type here under consideration as to achieve substantially uniform excitation of the discharge across the waveguiding laser cavity having a length considerably in excess of one-fourth of the excitation wavelength.

It is yet another object of the present invention to devise a laser arrangement of the above type which has a very small number of separate parts.

A concomitant object of the present invention is design the laser arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a waveguide laser arrangement which comprises a housing bounding an internal space. A laser stack is accommodated in the internal space and includes a first electrode having a major surface situated in and facing into the internal space; a dielectric waveguide body juxtaposed with the major surface of the first electrode and bounding at least one elongated laser cavity; a second electrode juxtaposed with the waveguide body across the laser cavity from, and forming a capacitor of a predetermined capacitance with, the first electrode; a dielectric spacer body juxtaposed with the second electrode across from the waveguide body and having one major surface facing toward, and another major surface facing away from, the second electrode; and distributed inductance means including a plurality of flat inductor coils distributed longitudinally of the laser cavity along and in juxtaposition with the other major surface of the spacer body and each having spaced first and second ends and a predetermined electric inductance between the ends. The laser arrangement further includes means for supplying a first electric potential to the first electrode and a second electric potential to the second electrode, at least one of the electric potentials alternating at a predetermined frequency relative to the other; and first and second connecting means for electrically connecting the first and second ends of each of the inductor coils with the first and second electrode, respectively, with attendant inclusion of the inductances of the inductor coils electrically in parallel with the capacitance.

A particular advantage of the arrangement of the present invention that is constructed in the above manner is that, due to the construction of the inductor coils as flat elements that extend along the respective major surface of the spacer body, it was possible to significantly reduce the overall height of the laser arrangement, and to make the inductor coils as integral parts of a separate flat inductor member or even as strips formed directly on the spacer body and thus considerably reduce the number of parts of the laser arrangement.

BRIEF DESCRIPTION OF THE DRAWING

The present invention will be described in more detail below with reference to the accompanying drawing in which:

FIG. 1 is a cross-sectional view of a waveguide laser arrangement of the present invention; and FIG. 2 is a partially sectioned perspective view of a fragment of the arrangement of FIG. 1. cl BEST MODE FOR CARRYING OUT THE INVENTION Referring now to the drawing in detail, and first to FIG. 1 thereof, it may be seen that the reference numeral 10 has been used therein to identify a distributed inductance RF-excited waveguide gas laser arrangement of the present invention in its entirety. The laser arrangement 10 includes as one of its components a metallic housing 11. It is currently preferred to make the housing 11 of aluminum, and particularly as an aluminum extrusion.

The housing 11 circumferentially bounds an internal space 12 which includes a first, larger portion 13 and a second, smaller portion 14 which is in open communication with the larger portion 13. The larger portion 13 of the internal space 12 is bounded by a bottom wall 15, two side walls 16 and 17, and incompletely by two top wall portions 18 and 19 of the housing 11, while the smaller portion 14 of the internal space 12 is bounded by two side walls 20 and 21 which are respectively integral with the top wall portions 18 and 19, and a top wall 22 which is integral with and interconnects the side walls 20 and 21. It is to be understood at this juncture that all references made herein with respect to directions and relative locations are intended solely for explanatory purposes in connection with the orientation of the laser arrangement 10 that is depicted in the drawings, regardless of the orientation the laser arrangement 10 may have when in use. It may be seen from the above explanation that the various walls and wall portions 15 to 22 of the housing 11 circumferentially completely surround and, inasmuch as the housing 11 is metallic, also air-tightly enclose, the internal space 12, and that the portions 13 and 14 of the internal space 12 communicate with one another at the region between the side walls 20 and 21.

The larger portion 13 of the internal space 12 accommodates a waveguide laser assembly 23 which includes, from bottom to top, a dielectric waveguide member or body 24 provided with waveguiding laser channels or cavities 25, a dielectric cover 26 for the waveguide member 24, a "hot" or active electrode 27, a dielectric spacer slab 28, and a distributed inductor member 29. It will be appreciated that the housing 11 is at ground potential so that a raised portion 30 of the bottom wall 15 of the housing 11 constitutes a ground electrode. Because of this use of the raised portion 30, it is possible to dispense with the heretofore customary separate ground electrode, as a result of which the dimensions and particularly the height of the laser arrangement can be significantly reduced in comparison to heretofore used constructions.

The laser arrangement 10 further includes a pressing member or top 31 that is connected to the housing 11 by respective recessed-head screws as illustrated, or by similar threaded fasteners 32. The pressing member 31 has a recess 33 which accommodates the walls 20 to 22 of the housing 11 with a clearance therefrom. The clearance or gap between the pressing member 31 and the walls 20 to 22 of the housing 11 has such a magnitude that, even when the threaded fasteners 32 are tightened to the full extent possible, the pressing member 31 will still not contact the walls 20 to 22. On the other hand, inasmuch as the pressing member 31 engages the wall portions 18 and 19 of the housing 11 when the pressing member 31 is assembled with the housing 11, and since the wall portions 18 and 19 are relatively thin and connected to the side walls 16 and 17 of the housing 11 in a cantilevered fashion, the tightening of the threaded fasteners 32 will result in a desirable slight downward deformation of the wall portions 18 and 19.

As a result of this deformation, the wall portions 18 and 19 will be pressed against the distributed inductor member 29 and the components 24 and 26 to 29 of the waveguide laser unit 23 will be pressed against one another and against the projecting portion 30 of the bottom wall 15 of the housing 11, thus eliminating any gaps between the housing 11 and the waveguide laser unit 23, as well as between the individual directly superimposed components 24 and 26 to 29 of the waveguide laser unit 23 and firmly holding the waveguide laser unit 23 and its components 24 and 26 to 29 in their respective positions.

Moreover, the tightening of the threaded fasteners 32 and the attendant deformation of the wall portions 18 and 19 of the housing 11 also result in the establishment of good electrical contact between the wall portions 18 and 19 and respective marginal portions 34 and 35 of the distributed inductance member 29 which are thus clamped between the wall portions 18 and 19 of the housing 11 and the dielectric slab 28. Inasmuch as the wall portions 18 and 19 are, like the remainder of the housing 11, at the ground potential, the marginal portions 34 and 35 of the distributed inductance member 29 are at the ground potential as well.

As also illustrated in FIG. 1 of the drawing, the pressing member 31 may be provided, if so desired, with respective heat-exchange passages 36, 37 and 38 through which a heat-exchange medium, especially a heat-exchange liquid, is being circulated to control the temperature of the pressing member 31 and, by conduction, also of the upper region of the housing 11. On the other hand, at least the bottom wall 15 of the housing 11 is usually in contact with a heat sink, so that heat is removed at least from the bottom portion of the housing 11 in this manner. The provision of the heat-exchange passages 36, 37 and 38 in the pressing member 31 and the circulation of the heat-exchange medium in these passages 36, 37 and 38, results in direct heat transfer either to or from the top portion of the housing 11, thus keeping the top portion of the housing 11 substantially at the same temperature as the bottom portion of the housing 11 and eliminating thermally induced bending of the laser arrangement 10 which could result in optical misalignment of the laser resonator. However, it will be realized that the heat-exchange passages are not required for some designs.

Turning now to FIG. 2 of the drawing in which portions of the housing 11, of the pressing member 31, and of the waveguide laser unit 23 have been removed to be able to illustrate some additional features and components of the laser arrangement 10, it is to be mentioned first that the aforementioned internal space 12 is further air-tightly separated from the ambient atmosphere by respective end walls and sealing elements which have been omitted from the drawing since they are constructed and mounted on the housing 11 in a manner which is customary in the gas laser field. Such end walls carry or are provided with mirrors, exit windows and/or other optical elements that longitudinally delimit the laser cavities 25 or let the laser beam issue from the laser arrangement 10, as indicated by an arrow 39. It should be understood that, while the channel 25 of the waveguiding member 24 has been indicated to extend along a Z-shaped course, the waveguiding member 24 could be provided with channels extending along other courses, such as parallel ones, and the adjacent channels 25 could communicate with one another over at least parts of their lengths and heights to achieve phase locking between and among the laser beams propagating in such channels 25.

It is also shown in FIG. 2 of the drawing that the marginal portions 34 and 35 of the distributed inductor member 29 are configured as current-conducting rails that extend in the longitudinal direction of the laser arrangement 10. The distributed inductor member 29 further includes a plurality of flat inductor coils 40 alternating ones of which are connected with the marginal portions 34 and 35, respectively, coil in opposite senses, and have respective free ends 41 which are connected, such as by electron beam welding, to respective electrically conductive pins 42 which, in turn, are connected, such as again by electron beam welding, with the "hot" electrode 27. As a comparison of FIGS. 1 and 2 with each other will reveal, the dielectric slab 28 is provided with a plurality of holes 43 for the passage of the respective pins 42 therethrough.

The electrode 27 is supplied, in a manner that is well known to those active in this field and which is indicated in FIG. 2 only diagrammatically by a power source 44 and an electric supply line 45, with an alternating electric current at a frequency preferably in the radio frequency range of the spectrum, so that the electrode 27 and the bottom wall 15 of the housing 11 or its projecting portion 30 form a capacitance, and laser excitation takes place in the channels 25 of the waveguide plate 24. Now, since the bottom wall 15 of the housing 11 is at the ground potential and so are, as mentioned before, the current-conducting rails or marginal portions 34 and 35 of the distributed inductance member 29, while the voltage encountered at the free end portions 41 of the coils 40 oscillates substantially at the same rate as that of the "hot" electrode 27, due to the connection of the respective end portions 41 with the electrode 27, the inductor coils 40 are electrically arranged in parallel to one another and also in parallel to the aforementioned capacitance. In this manner, the inductance of the inductor coils 40 is effectively distributed over the length of the waveguide laser unit or assembly 23 as needed for efficient operation of the laser arrangement 10. It is to be mentioned at this juncture that the inductances of the inductor coils 40 are such that the inductor coils 40 are in or close to resonance with the aforementioned capacitance at the frequency at which the current supplied to the electrode 27 oscillates.

The pins 42 mechanically connect the distributed inductor member 29 with the electrode 28 and are sufficiently strong to form an essentially rigid structure which is self-supporting even in the absence of the dielectric slab or spacer 28. The selfsupporting properties of this rigid structure are further improved when, as indicated in FIG. 2 of the drawing, the current-conducting rails 34 and 35 are interconnected at least at the longitudinal end portions of the arrangement 10, by respective interconnecting portions, such as 46.

However, it will be appreciated that, as also contemplated by the present invention, the "hot" electrode 27 and the distributed inductor member 29 could be provided directly and integrally on the slab 28 as respective metallic strips or layers, for instance by resorting to the well-known electroplating or electrodeposition techniques, and be connected with one another by electrically conductive pins or the like embedded in, or accommodated in holes of, the dielectric slab or spacer 28.

Referring once more to FIG. 1 of the drawing, it is to be mentioned that the smaller portion 14 of the internal space 12, which is situated above the inductor coils 40, keeps the housing 11 at a distance from the inductor coils 40 and particularly from the "hot" end portions 41 of the coils 40, so as to minimize the electric field and especially the attendant parasitic capacitance existing between the inductor coils 40 and the housing 11.

It may be seen that, because of the provision of the inductor coils 40 as discrete portions of the separate member 29 which may be obtained by stamping, machining or in a similar manner from a relatively thin plate of a metallic material, such as aluminum, there is obtained a desirable further reduction in the height of the laser arrangement 10 on top of that obtained as a result of the incorporation of the ground electrode into the housing 11 as a raised portion 30 thereof. The height of the laser arrangement 10 may be further reduced when the electrode 27 and the distributed inductor member 29 are provided directly on the slab 28 by electrodeposition or the like.

A further important advantage of the construction of the laser arrangement 10 in accordance with the present invention is that the number of parts of the laser arrangement 10 and especially of those parts that are to be axially introduced into the larger portion 13 of the internal space during the assembly of the laser arrangement 10 is drastically reduced as compared to those laser arrangement constructions which are being currently used where the inductors and the mounting and connecting elements associated therewith are constructed as separate parts. Thus, as an example, the number of elements contained in the stack or laser unit 23 is reduced from forty or more in a heretofore used construction to four or less in the construction embodying the present invention.

While the present invention has been illustrated and described as embodied in a particular construction of an RF-excited distributed inductance waveguide laser arrangement, it will be appreciated that the present invention is not limited to this particular example; rather, the scope of protection of the present invention is to be determined solely from the attached claims.

We claim:

1. A waveguide laser arrangement comprising:
a housing bounding an internal space;

a first electrode having a major surface situated in and facing into said internal space;

a dielectric waveguide body juxtaposed with said major surface of said first electrode and bounding at least one elongated laser cavity;

a second electrode juxtaposed with said waveguide body across said laser cavity from, and forming a capacitor of a predetermined capacitance with, said first electrode;

a dielectric spacer body juxtaposed with said second electrode across from said waveguide body and having one major surface facing toward, and another major surface facing away from, said second electrode;

distributed inductance means including a plurality of flat inductor coils distributed longitudinally of said laser cavity along and in juxtaposition with said other major surface of said spacer body and each having spaced first and second ends and a predetermined electric inductance between said ends;

means for supplying first electric potential to said first electrode and a second electric potential to said second electrode, at least one of said electric potentials alternating at a predetermined frequency relative to the other; and first and second connecting means for electrically connecting said first and second ends of each of said inductor coils with said first and second electrode, respectively, with attendant inclusion of said inductances of said inductor coils electrically in parallel with said capacitance.

2. The waveguide laser arrangement as defined in claim 1, wherein first potential is a ground potential.

3. The waveguide laser arrangement as defined in claim 2, wherein said second potential alternates at radio frequency relative to said ground potential.

4. The waveguide laser arrangement as defined in claim 1, wherein said housing is of an electrically conductive metallic material, and said first electrode is at least electrically connected with said housing.

5. The waveguide laser arrangement as defined in claim 4, wherein said first electrode is constituted by an integral part of said housing.

6. The waveguide laser arrangement as defined in claim 4, wherein said first connecting means includes at least one flat current-conducting rail integral with said first ends of at least some of said inductor coils to form a one-piece distributed inductance member with said inductor coils.

7. The waveguide laser arrangement as defined in claim 6, wherein said one current-conducting rail extends longitudinally of said spacer body at one lateral region thereof; and wherein said first connecting means further includes an additional current-conducting rail integral with said first ends of the remaining ones of said inductor coils to form an additional one-piece distributed inductance member with said remaining inductor coils.

8. The waveguide laser arrangement as defined in claim 7, wherein said some and said remaining inductor coils alternate with one another.

9. The waveguide laser arrangement as defined in claim 8, wherein said some and said remaining inductor coils coil in opposite senses.

10. The waveguide laser arrangement as defined in claim 7, wherein said first connecting means further includes connecting portions which are arranged at least at the longitudinal end portions of the spacer member and are integral with said one and with said additional current-conducting rail to integrally connect said distributed inductance member with said additional distributed inductance member into a one-piece structure.

11. The waveguide laser arrangement as defined in claim 6, wherein said housing has a portion which engages said current-conducting rail.

12. The waveguide laser arrangement as defined in claim 4, wherein said internal space of said housing has a portion juxtaposed with said inductor coils and separating said inductor coils by a predetermined distance from said housing.

13. The waveguide laser arrangement as defined in claim 1, wherein said inductor coils are constituted by metallic strips formed on said other major surface of said spacer body.

14. The waveguide laser arrangement as defined in claim 1, wherein said second electrode is constituted by a metallic layer formed on said one major surface of said spacer body.

15. The waveguide laser arrangement as defined in claim 1, wherein said spacer body has a plurality of longitudinally spaced openings extending between and opening on said major surfaces of said spacer body; and wherein said second connecting means includes a plurality of pins each received in one of said openings and connecting said second end of one of said inductor coils with said second electrode.

16. The waveguide laser arrangement as defined in claim 15, wherein said spacer body includes at least two separate spacer body members abutting one another at a parting plane passing through said openings.

* * * * *